United States Patent [19]

Linden

[11] 4,356,433
[45] Oct. 26, 1982

[54] HID LAMP POWER SUPPLY

[75] Inventor: Nicholas O. Linden, Cleveland, Ohio

[73] Assignee: The Nuarc Company, Inc., Chicago, Ill.

[21] Appl. No.: 166,159

[22] Filed: Jul. 7, 1980

[51] Int. Cl.³ .............................................. G05F 1/00
[52] U.S. Cl. ..................................... 315/308; 315/208; 315/DIG. 7; 323/246
[58] Field of Search ......... 315/308, 307, 208, DIG. 7, 315/194; 307/252 N, 252 Q; 323/242, 243, 246

[56] References Cited

U.S. PATENT DOCUMENTS

| | | | |
|---|---|---|---|
| 3,317,789 | 5/1967 | Nuckolls | 323/242 |
| 3,374,420 | 3/1968 | Weber | 323/246 |
| 3,999,100 | 12/1976 | Dendy et al. | 315/308 |
| 4,228,494 | 10/1980 | Stifter | 323/423 |
| 4,240,009 | 12/1980 | Paul | 315/308 |

FOREIGN PATENT DOCUMENTS 2052190  1/1981  United Kingdom.

Primary Examiner—Harold A. Dixon
Attorney, Agent, or Firm—Mason, Kolehmainen, Rathburn & Wyss

[57] ABSTRACT

The present invention relates to power supplies, and more particularly, to a power supply which is particularly suitable for controlling a high intensity discharge (HID) lamp. In particular, the present invention relates to an HID lamp power supply which provides fast warm up for a cold lamp, regulation against line voltage fluctuations and a lamp starting circuit which provides extremely fast restart when the lamp is hot and has been turned off momentarily.

25 Claims, 3 Drawing Figures

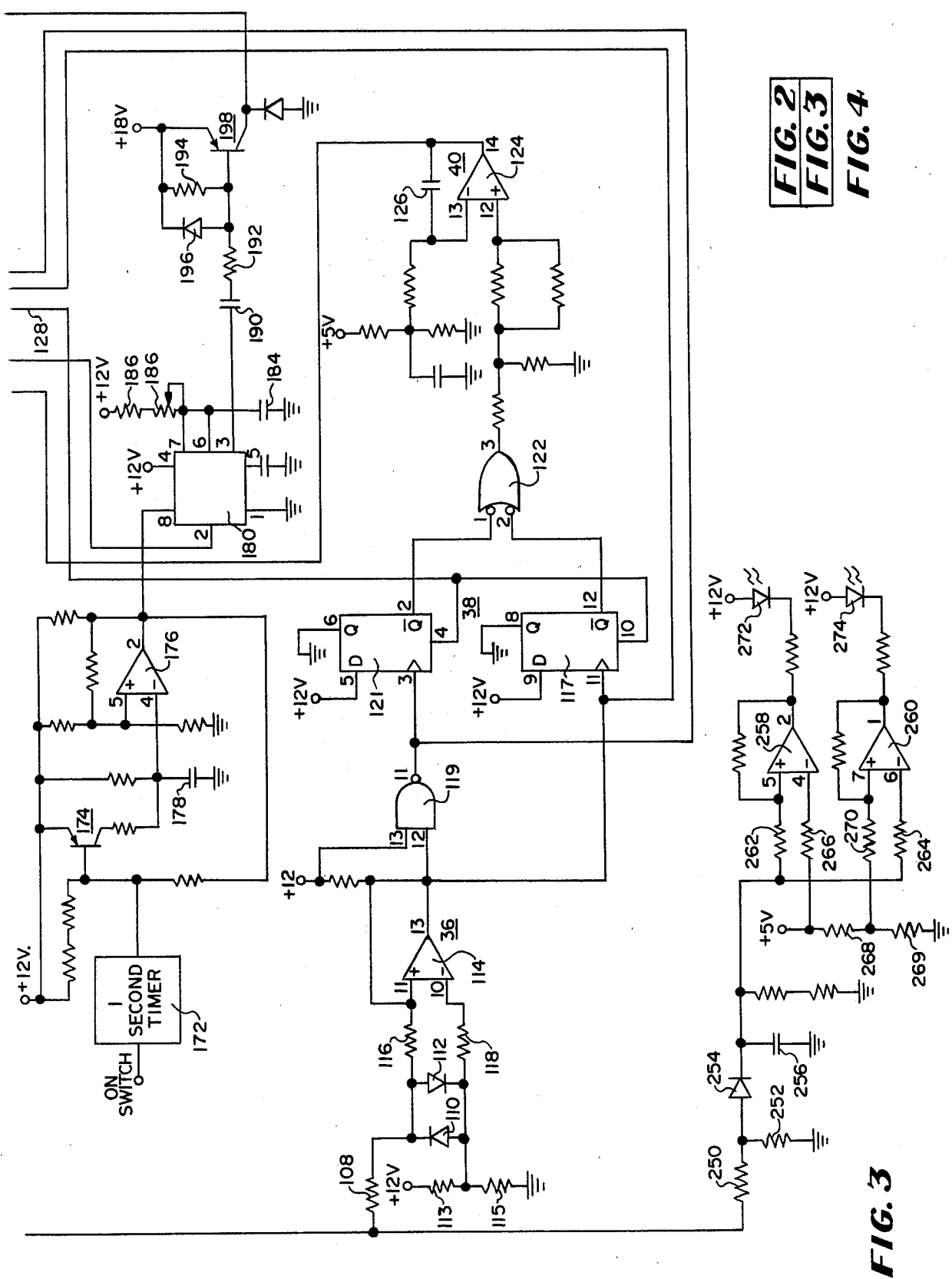

HID LAMP POWER SUPPLY

BACKGROUND OF THE INVENTION

1. Field of the Invention

The present invention relates to power supplies, and more particularly, to a power supply which is particularly suitable for controlling a hgh intensity discharge (HID) lamp. In particular, the present invention relates to an HID lamp power supply which provides fast warm up for a cold lamp, regulation against line voltage fluctuations and a lamp starting circuit which provides extremely fast restart when the lamp is hot and has been turned off momentarily.

2. Description of the Prior Art

When an arc is initially struck in a cold HID lamp the voltage across the lamp is very low until the normal operating temperature of the lamp has been reached. With conventional ballast arrangements which limit the current to a relatively low value during warm up, a long period of time is required before the lamp reaches normal operating conditions and provides full light output.

Various proposals have been made to reduce the warm up time required in starting up a cold HID lamp. Such arrangements are shown, for example, in Michalski U.S. Pat. No. 3,555,352, Engel et al U.S. Pat. No. 3,590,316, Pitel U.S. Pat. No. 3,931,544, Helmuth U.S. Pat. No. 3,944,876 and Dendy et al U.S. Pat. No. 3,999,100. These prior art arrangements accomplish a reduction in warm up time for the lamp by passing a relatively large average current throgh the lamp initially so that it will more quickly reach operating temperature. However, the circuitry provided to supply this increased warm up current in such prior art arrangements has the disadvantage that the peak value of the warm up current is substantially greater than the average value thereof. When such large peak currents are drawn through the lamp during the warm up period there is a tendency for the lamp electrodes to deteriorate and shorten the life of the lamp. It would be desirable to provide a fast warm up period without subjecting the lamp to excessively high peak currents during this period when the average lamp current is already large.

While certain current stabilizing arrangements have been employed in the arc welding art which provide an essentially rectangular wave form for the welding current, these arrangements are not suitable for use with HID lamps wherein the lamp undergoes a major change in characteristics during the warm up period, as outlined above. Examples of such current stabilizing arrangements are shown in Sato et al U.S. Pat. No. 3,364,334, Lepp et al U.S. Pat. No. 3,845,380 and Risberg U.S. Pat. No. 4,038,515.

A power supply for starting and operating an HID lamp has the further requirement that it must initiate an arc within the lamp both when the lamp is cold and after the lamp is hot and is turned off momentarily and then turned back on. Metal halide HID lamps require an extremely high level of strike pulses to initiate an arc, commonly called restriking, after the lamp is hot and has been turned off. This is because the lamp has a high resistance when hot and the hot gases are under high pressure so that the lamp has a very high breakdown voltage.

While certain arrangements have been proposed for restarting a hot HID lamp, these arrangements have been unsatisfactory in that a rather substantial period of time is still required to restart a hot lamp. Examples of such hot restrike circuit arrangements are shown in Hallay U.S. Pat. No. 3,476,977, Hashimoto U.S. Pat. No. 4,522,475 and Helmuth U.S. Pat. No. 3,944,876. Also of interest in connection with the general problem of high current pulse switching is the RCA solid State '74 Databook Ser. SSD-206B, pp. 359-363.

It is therefore an object of the present invention to provide a new and improved HID power supply wherein one or more of the disadvantages of the prior art arrangements are avoided.

It is another object of the present invention to provide a new and improved HID lamp power supply which minimizes the warm up time of the lamp while subjecting it to a warm up current which has a crest factor which is very low so that the lamp is not subjected to extremely large peak currents during the warm up period.

It is a further object of the present invention to provide a new and improved HID lamp power supply wherein relatively fast warm up is achieved by providing current to the lamp in the form of an essentially rectangular wave which is controlled by a circuit which holds the sum of the current through the lamp and the voltage developed across the lamp constant so that a load line characteristic is provided during the warm up period which proportionately decreases the warm up current as the voltage across the lamp increases.

It is another object of the present invention to provide a new and improved HID lamp power supply wherein a regulated square wave of current is supplied to the lamp and a strike pulse circuit is provided which cooperates with the regulating circuit to provide substantially instantaneous restart of a hot lamp which has been momentarily extinguished.

SUMMARY OF THE INVENTION

Briefly considered, the arrangement of the present invention employs an SCR bridge and energy storage inductor arrangement to supply power in the form of a square wave of current to an HID lamp from a conventional AC line voltage source. The firing point of the SCR's in the bridge circuit is controlled from a power supply control circuit which senses both the current through the lamp and the voltage across the lamp so that the lamp operates against a load line which is established by holding the sum of the current and voltage components constant. The power supply thus supplies, for example, a current of thirty amps to a 2 KW cold HID lamp to allow the lamp to come to operating temperature quickly. As the lamp heats up its arc voltage increases from a low value of thirty volts to a steady state value of two hundred volts. This increasing arc voltage causes the power supply to proportionately decrease its output from thirty amps to ten amps, i.e., its normal operating value.

A lamp strike circuit is provided which develops high voltage pulses which are supplied to the primary windings of a pair of lamp strike transformers the secondaries of which are connected in series with the electrodes of the lamp. A capacitor is connected in series with each lamp strike transformer primary which is charged from a d.c. voltage and is discharged through the series combination of a small saturable reactor, an SCR and the transformer primary. The SCR is fired in timed relation to the wave form developed across the lamp by the main bridge SCR circuit so that an arc is initiated in the lamp at a time when the bridge SCR's are still conducting so that they supply the necessary follow through current to establish full conduction in the lamp once an arc is initiated. The use of a saturable reactor in series with the SCR which discharges the transformer capacitor permits the usage of relatively inexpensive SCR's in the lamp strike circuit, these inexpensive SCR's being protected by the saturable reactor until they are rendered fully conductive. The saturable reactor is constructed to have a hysteresis characteristic with extremely sharp corners so that this reactor saturates extremely quickly and produces a correspondingly rapid change in the voltage applied to the transformer primary so that high amplitude strike pulses are developed for the lamp which are capable of immediately restarting it when it is hot and is turned off momentarily.

BRIEF DESCRIPTION OF THE DRAWINGS

The invention, both as to its organization and method of operation, together with further objects and advantages thereof, will best be understood by reference to the following specification taken in connection with the accompanying drawings, in which:

FIGS. 2 and 3, when placed together in the manner shown in FIG. 4 comprise a schematic diagram of the power supply of FIG. 1;

DESCRIPTION OF THE PREFERRED EMBODIMENTS

Figure 1:
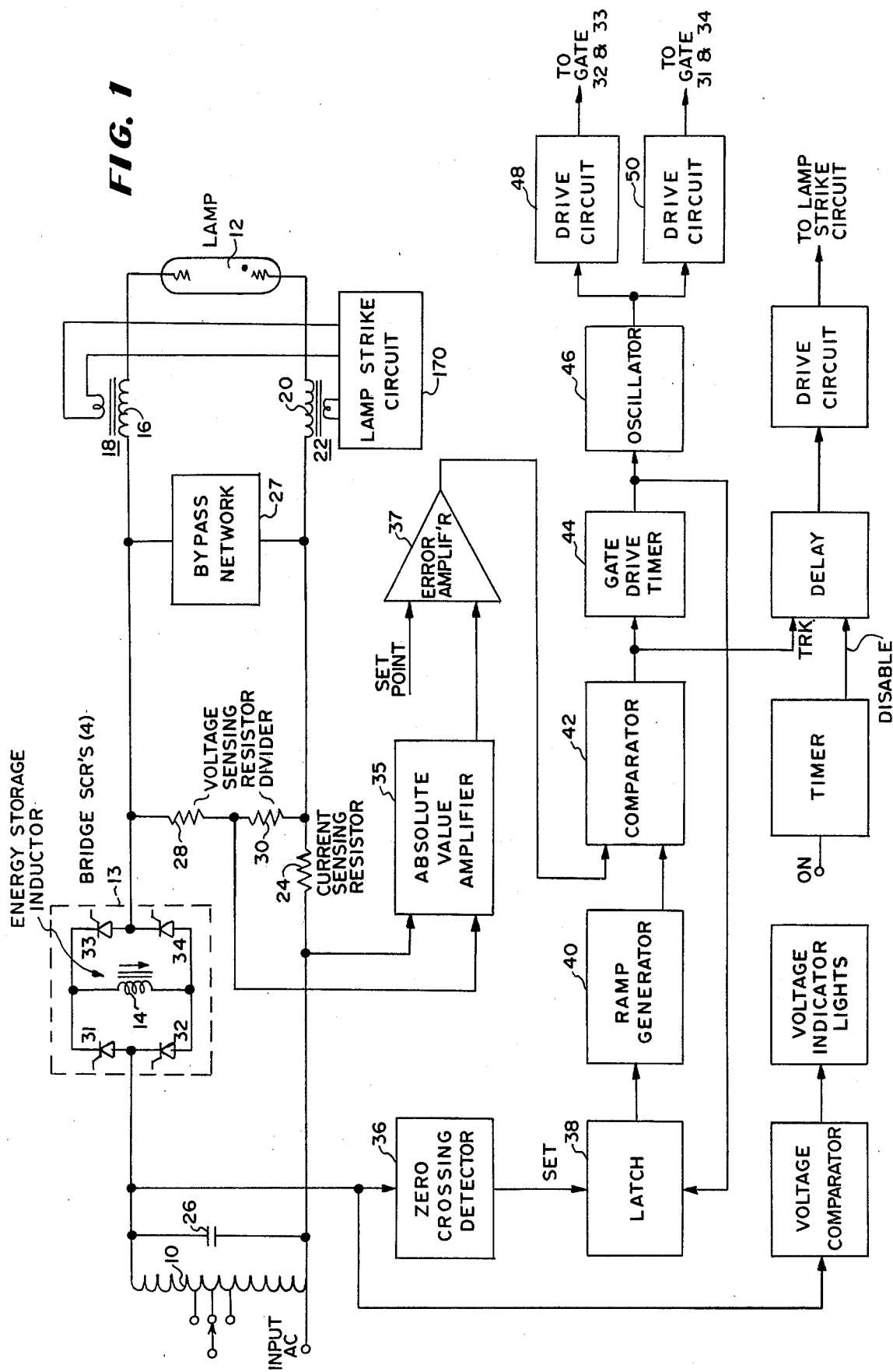
FIG. 1 is a block diagram of the power supply of the present invention.

Referring now to the drawings, an auto transformer 10 is employed to supply AC power to the metal halide lamp 12 through an AC current control circuit 13 comprising the SCR's 31, 32, 33 and 34 and a large DC energy storage inductor 14. More particularly, the upper end of the auto transformer 10 is connected through the circuit 13 and through the secondary winding 16 of a lamp strike transformer 18 to one electrode of the lamp 12, the other electrode of the lamp being connected through a secondary winding 20 of a second lamp strike transformer 22 and a current shunt resistor 24 to the bottom end of the auto transformer 10. A power factor correction capacitor 26 is connected across the transformer 10. A bypass network 27 is connected to the adjacent ends of the transformer secondaries 16, 20 to prevent the high voltage lamp strike pulses from affecting the SCR bridge circuit, as will be described in more detail hereinafter.

In order to control the firing point of the SCR's in the AC current control bridge, the voltage across the lamp 12 is also sensed by means of a voltage divider comprising the resistors 28 and 30 which are connected in series across the lamp 12 through the secondary winding 16, 20 of the transformers 18, 22 respectively. The voltage across the resistor 30 of this voltage divider is thus proportional to the voltage across the lamp 12 and the sum of the voltages across the current sensing resistor 24 and the voltage sensing resistor 30 is amplified in an absolute value amplifier 35 and compared with a set point reference signal in an error amplifier 37. The common circuit ground, which is not the safety ground of the AC line, is made to the left hand end of the resistor 24.

Figure 6:
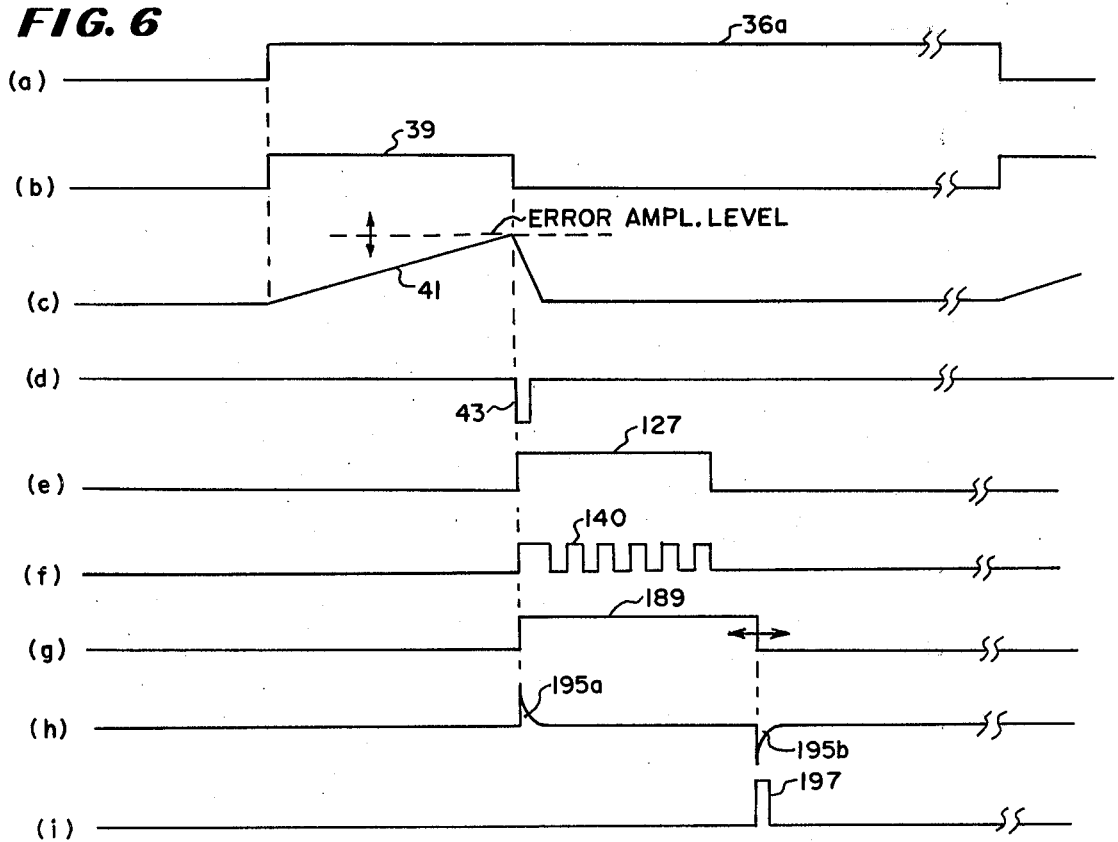
FIG. 6 is a series of wave forms illustrating the operation of portions of the power supply circuit of FIG. 1.

A zero crossing detector 36 is controlled from the AC current developed across the auto transformer 10 and provides a signal 36a (FIG. 6a) at the zero crossover points of the AC wave. Each inflection of the signal 36a is employed to set a latch 38 and initiate a latch pulse 39 (FIG. 6b). The pulse 39 is employed to start a ramp generator 40. The ramp voltage 41 (FIG. 6c) developed by the ramp generator 40 is connected to one input of a comparator 42 to the other input of which is supplied the error signal proportional to the deviation of the sum of the current through the lamp 12 and the voltage across the lamp 12 from the desired set point. As this error voltage varies in amplitude the output of the comparator 42 provides a variably timed output 43 (FIG. 6d) which is supplied to a gate drive timer 44. The gate drive timer 44 develops a gating pulse 127 (FIG. 6e) which is employed to enable a 40 kiloherz oscillator 46 for a brief period of time so that an oscillator pulse train 140 (FIG. 6f) is developed during which gate drive pulses are alternately supplied to the drive circuits 48 and 50. The output of the drive circuit 48 is employed to control the firing of the SCR's 32 and 33 and the output of the drive circuit 50 is employed to control firing of the SCR's 31 and 34. The output of the gate drive timer 44 is also supplied to the latch 38 to reset this latch at the end of the burst of oscillator pulses developed by the oscillator 46 so that the latch 38 may again be set at the next zero crossing of the AC wave during the next half cycle.

Figure 7:
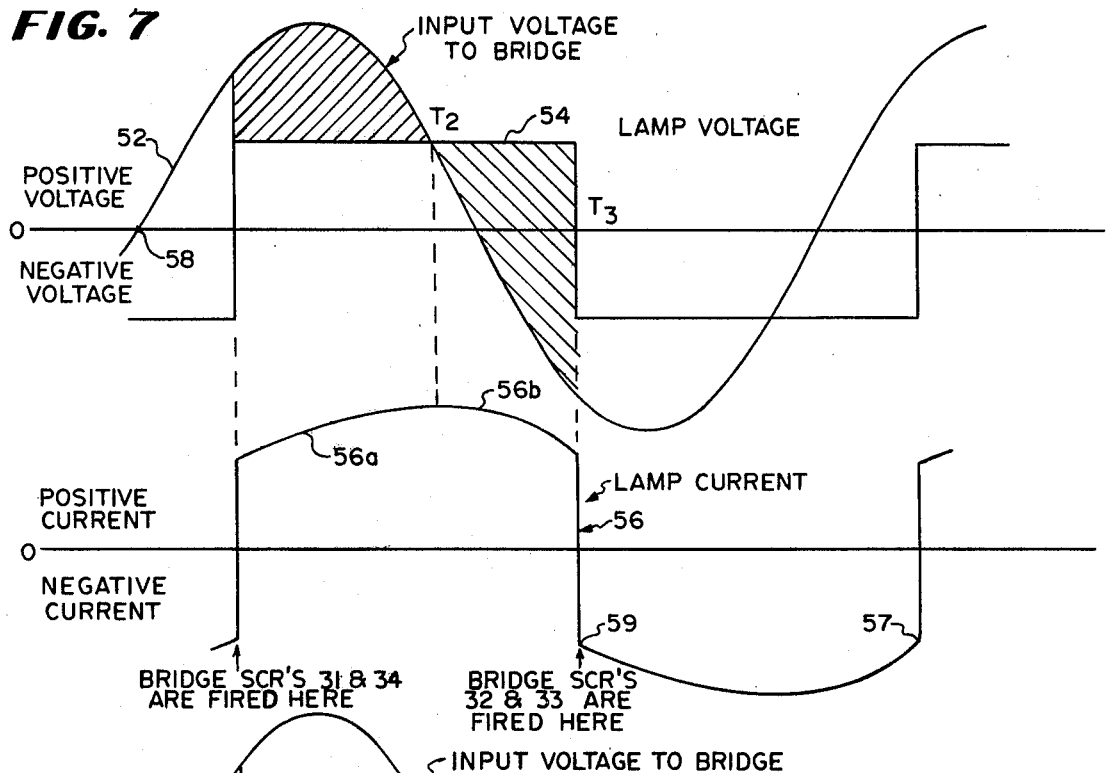
FIGS. 7 and 8 are a series of waveforms illustrating the operation of the energy storage indicator and SCR bridge arrangement in the system of FIG. 1.

Considering now the manner in which the SCR bridge circuit and energy storage inductor 14 function to control the flow of current in the lamp 12, reference may be made to FIG. 7 wherein the lamp voltage and lamp current waveforms are shown in relation to the AC input voltage to the SCR bridge. It will be noted that the energy storage inductor 14 is connected so that current flows through the inductor in only one direction. Thus, when the AC voltage across the auto transformer 10 is positive the SCR's 31 and 34 conduct so that current flows through the inductor in the direction indicated by the arrow in FIG. 1. Similarly, when the voltage across the transformer 10 is negative the SCR's 32 and 33 conduct and current flows through the inductor 14 in the same direction. The energy storage inductor "sees" the voltage difference between the AC input voltage 52 (FIG. 7 and the arc voltage of the lamp, indicated in a somewhat idealized manner by the waveform 54. For current to flow into the lamp 12 the SCR's 31 and 34 are turned on at time T1. Since the input voltage is greater than the arc voltage the current through the inductor, and hence through the lamp 12, increases as shown by the portion 56a of the lamp current waveform 56 in FIG. 7. The rate of increase in current is slow in relation to the AC line frequency and the increase in current is not great, although this increase (the portion 56a) is shown somewhat out of scale in FIG. 7 for purposes of illustration. The input voltage then falls below the lamp arc voltage 54 causing the current through the inductor to decrease as shown by the portion 56b of the lamp current waveform 56. The inductor maintains positive current flow through the lamp during this time and energy is released from the inductor 14. At time T3 the SCR's 32 and 33 are turned on and they start to conduct the inductor current. As 32 and 33 turn on, 31 and 34 turn off as the current through them goes to zero. The inductor is now reversed in the circuit and it forces the current to flow out of the lamp 12. The inductor 14 now sees positive voltage across it and the current increases. This sequence occurs every cycle of the input AC wave.

At a steady state condition the current at the end of a given half cycle is equal to the current at the beginning of that half cycle, i.e., the current at the end 57 of the negative half cycle of the waveform 56 shown in FIG. 7, will be equal to the current at the beginning of that half cycle at the point 59 in FIG. 7. Control over the lamp current is achieved by varying the firing points of the bridge SCR's relative to the zero crossing points of the AC input wave to the SCR bridge. To increase current the firing point is moved towards the zero crossover point 58 of the AC wave 52 which results in more positive volt-seconds than negative volt-seconds across the energy storage inductor 14. As a result, the current at the end of a given half cycle is greater than the current at the beginning of that half cycle. The next half cycle will then start with this greater current and add to it again. When the current has increased sufficiently the control circuit changes the bridge firing point to hold the current in the inductor 14 at the desired level. To decrease the current through the lamp 12, the bridge firing point is moved away from the zero crossover point 58 which results in more negative volt-seconds than positive volt-seconds across the inductor 14 and thus decreases the current flow through the inductor at the end of each half cycle.

The actual operation of the circuit of FIG. 1 deviates from the ideal arrangement shown in FIG. 7 due to the resistance losses in the energy storage inductor 14, the inductance of the secondary windings 16, 20 of the lamp strike transformers 18, 22, and the non-constant arc voltage of the lamp 12.

Considering first the effect of the resistive losses in the inductor 14, the resistance of the wire in this inductor requires more positive volt-seconds across the inductor than negative volt-seconds. A voltage drop equal to the current flow through the inductor times the resistance of this inductor subtracts from the voltage impressed across the inductor 14 by the SCR bridge circuit. Since the current flows through the inductor only in the "positive" direction, there is always a "positive" voltage loss across the inductor 14. The control circuit described above in connection with FIG. 1 compensates for this loss by firing the bridge SCR's earlier each half cycle to provide the necessary additional positive voltage across the inductor.

Figure 8:
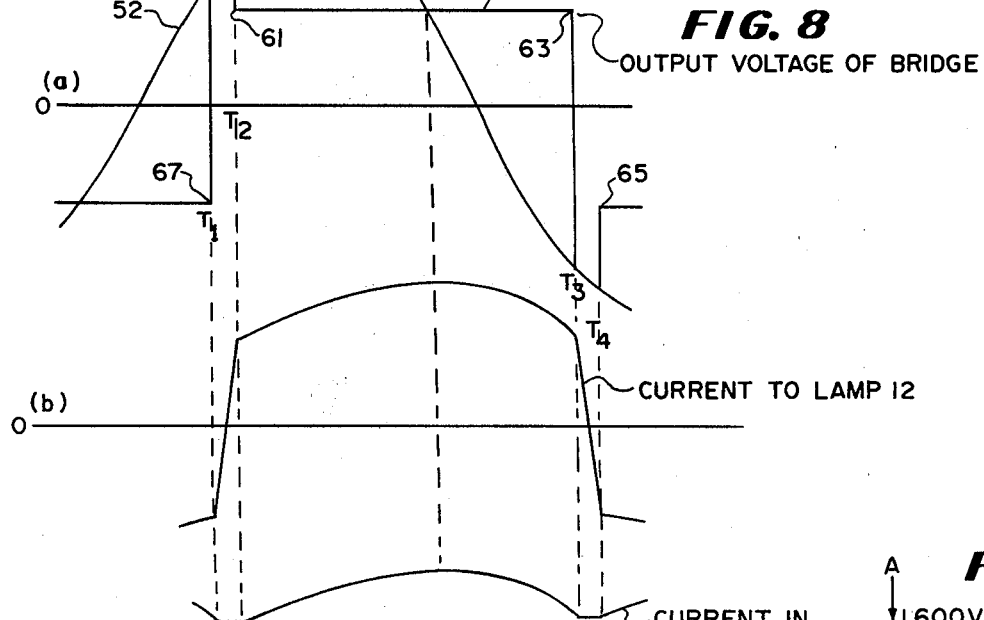

The effect of the inductance of the lamp strike transformer windings 16, 20 is to prevent the current from reversing through the lamp 12 instantaneously. Waveforms shown in FIG. 8. Referring to this Figure, at the time T1 the bridge SCR's 31 and 34 are turned on. At this point in time the SCR's 32 and 33 are already turned on from the negative half cycle. Due to the inductance of the lamp strike transformers, the current through the lamp does not reverse instantaneously. During the time T1 to T2 all four SCR's conduct creating a short circuit across the bridge from the input to the output. The input voltage appears at the output of the bridge and this voltage causes the current in the lamp and ignition transformers to reverse. The energy storage inductor 14 sees essentially zero voltage across it during this time and its current remains constant and circulates through the four conducting SCR's of the bridge. When the lamp current is equal to the current through the inductor the SCR's 32 and 33 turn off as indicated at T2. The time period T1 to T2 is thus the "free wheeling" time of the bridge. The same sequence occurs between times T3 and T4, as shown in FIG. 8.

During each half cycle the lamp voltage of a hot lamp is not constant but has a drooping characteristic. Thus, the lamp voltage waveform 54 in FIG. 7 and its corresponding waveform 60 in FIG. 8 are somewhat idealized. In the actual circuit the waveform 60, for example, is such that the output voltage at point 61 of the waveform 60 may have a value of plus 230 volts whereas this waveform has drooped to a value of plus 160 volts at point 63 (FIG. 8). Similarly, during the negative half cycle the voltage at time T4, i.e., the point 65 on the waveform 60 may have a value of minus 230 volts and the end of this half cycle this voltage will have drooped to a value of minus 160 volts, i.e., the point 67 shown in FIG. 8.

As discussed generally heretofore, the firing point of the SCR bridge is controlled in such a manner as to hold the sum of the current through the lamp and the voltage across the lamp constant. In accordance with an important aspect of the present invention the firing point control circuit is arranged so that control of the lamp takes place along a load line which is chosen so that it includes both the maximum warm up current point for the lamp as well as the normal operating point of the lamp. For example, when an arc discharge is initially struck in a cold lamp, the maximum permissible warm up current may be 27 amperes with a voltage of 30 volts across the lamp. On the other hand, when the lamp has warmed up to normal operating conditions the normal operating point may be 200 volts across the lamp with a current of 10 amps through the lamp. The load line characteristic of the present invention is constructed to include both this maximum current operating point and the normal operating point of the lamp. In particular, the load line along which the power supply operates is established by considering two conditions. The first condition is when the lamp 12 is short circuited so that maximum current will be flowing through the resistor 24 and no voltage will be produced across the voltage sensing resistor divider 28, 30. The other condition for establishing the load line is the condition wherein the lamp 12 is open circuited in which case maximum voltage is developed across the voltage sensing divider 28, 30 and no current flows through the current sensing resistor 24. By holding the sum of the voltage across the resistor 24 (which is proportional to current through the lamp 12) and the voltage across the resistor 30 (which is proportional to the voltage across the lamp 12) constant the correct load line characteristic may be established so that the lamp will initially be operated at the maximum current operating point and will automatically move back along the load line to the normal operating point as the lamp warms up and the voltage across the lamp increases.

If it is assumed that the resistor 24 has a value of 0.005 ohms a short circuit current of 30 amperes through the resistor 24 will produce a voltage across this resistor of 150 millivolts. If current is plotted along the abcissa and voltage along the ordinate, as in FIG. 5, the bottom point of the load line 70 is then established at 30 amperes i.e., a point along the abcissa. The other end of the load line 70 along the ordinate is chosen to give this same level of 150 millivolts for an open circuit condition in which voltage appears across the lamp but no current is flowing through the resistor 24. Assuming an open circuit voltage of 300 volts, the values of the resistors 28 and 30 are chosen so that the voltage across the resistor 30 also equals 150 millivolts, thereby defining the upper point of the load line 70. By controlling the SCR bridge in accordance with the sum of the current and voltage components and holding this sum always at 150 millivolts, the linear load line 70 is produced which gives all of the operating points of the power supply from the time at which an arc is initially struck in the lamp while the lamp is cold and during the warm up period until the lamp has reached normal operating conditions. More particularly, when an arc is initiated in the lamp 12 a voltage of approximately 30 volts will be produced across the cold lamp so that a current of 27 amperes will flow through the lamp. The value of this maximum warm up current is determined by the load line 70 and the values of the resistors 24, 28 and 30 are chosen so that the current which flows when an arc is initiated in the lamp 12 is the maximum value which can be forced through the lamp under cold conditions without damage to the lamp. In this connection it should be noted that with the arrangement of the present invention the current waveform through the lamp, i.e., the waveform 56 shown in FIG. 7 has an extremely low crest factor as compared to a sinusoidal waveform. In a sinusoidal waveform the peak value of current is 1.4 times the RMS value whereas with the current arrangement of the present invention and an energy storage inductor 14 of 120–200 millihenrys, a crest factor of 1.2 to 1.1 can be obtained. This means that a large warm up current may be passed through the lamp 12 in order to bring it quickly to normal operating conditions without subjecting the lamp to an extremely large peak current which would cause deterioration of the electrodes of the lamp and shorten the life thereof. As noted above, the curvature of the relatively flat topped portions of the waveform 56 is somewhat exaggerated in FIG. 7 for purposes of illustration.

Considering further the operation of the regulation circuit of the present invention, when an arc is initiated in the lamp 12 the cold lamp operating point 71, on the load line 70, is established so that a maximum current flows through the lamp to bring it to full light output as quickly as possible. As the lamp warms up the arc lamp voltage increases and the operating point moves up the load line so that the current through the lamp is proportionately decreased until the normal operating voltage of 200 volts is reached, i.e., the point 72 on the load line 70. At this point the lamp is operating under normal conditions with a current of 10 amperes flowing through the hot lamp. With the lamp operating at the normal operating point 72 on the load line 70 the current control system of the present invention also functions to stabilize the lamp against line voltage fluctuations in the AC supply. Thus, if the line voltage increases the current through the lamp tends to increase, however, this current is employed to control the firing point of the SCR bridge so that it is moved away from the zero crossover point 58 with the result that the lamp current is held constant.

It should be noted that the AC current control arrangement of the present invention does not operate to hold the AC power supplied to the lamp constant as in certain of the above discussed prior art arrangements. On the contrary, the present invention provides a linear load line type of operation in which the current is proportionally decreased from its maximum initial value as the lamp warms up. When an arc is initially struck in the lamp the current is limited to 27 amperes with a voltage of approximately 30 volts across the lamp so that the power is approximately 810 watts. On the other hand, when the lamp warms up and reaches the normal operating point 72 on the load line 70 the current is 10 amperes with a voltage of 200 volts across the lamp, i.e., 2000 watts of AC power being supplied to the lamp.

Figure 2:
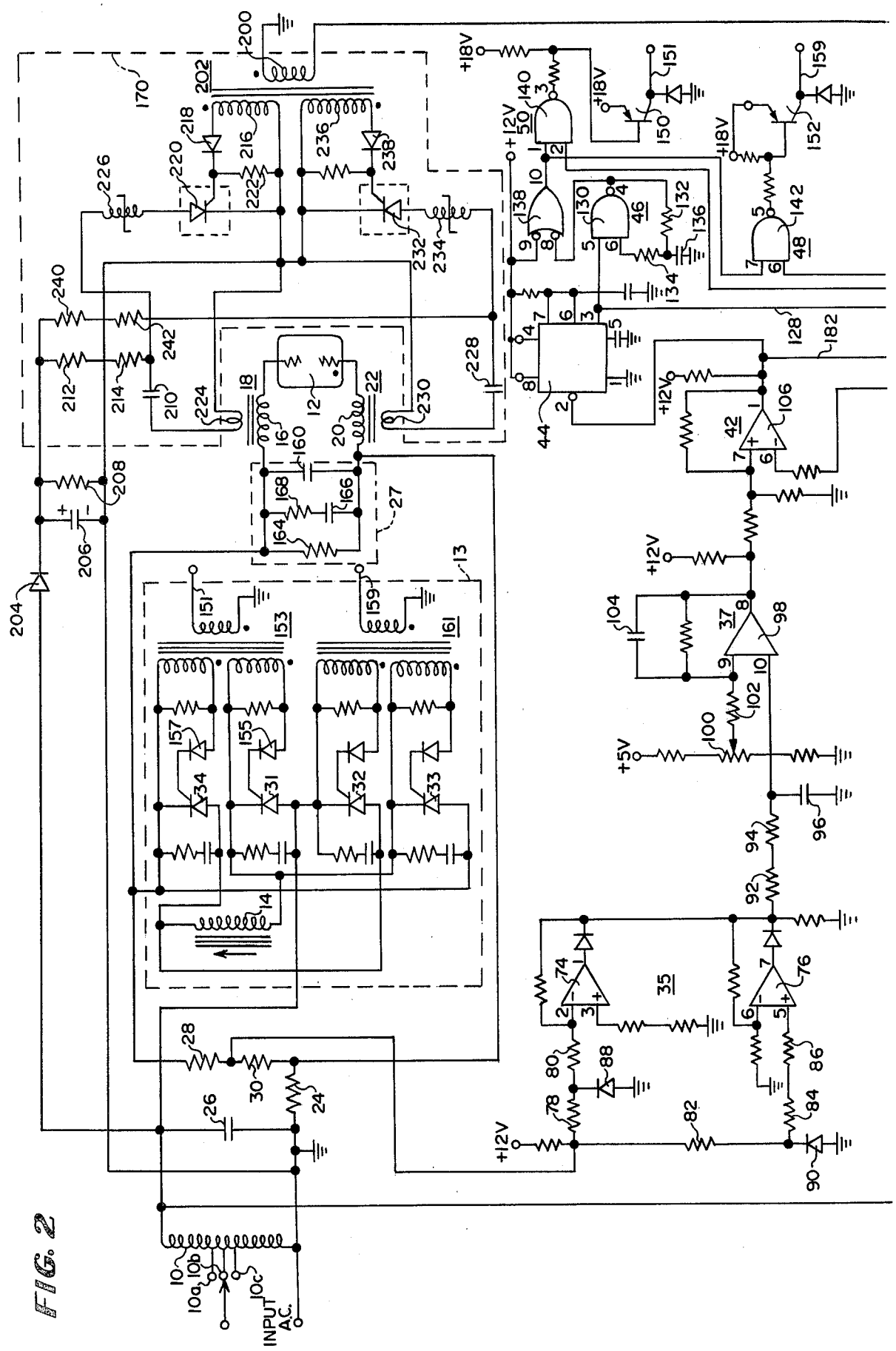

Referring now to the detailed circuitry of the power supply of the present invention shown in FIGS. 2 and 3, in these figures identical circuit components have been given the same reference numerals as in FIG. 1. The sum of the voltages developed across the resistors 24 and 30 is applied to the input of a pair of operational amplifiers 74, 76 which are preferably of the commercial type LM 324, this composite waveform being coupled through the resistors 78, 80 to the inverting input of the operational amplifier 74 and through the resistors 82, 84 and 86 to the noninverting input of the operation amplifier 76. The diodes 88 and 90 are provided to protect the absolute value amplifier 35 from negative signals which are greater than 0.3 volts since the operational amplifiers 74, 76 are designed to work with positive input voltages.

The two operational amplifiers 74, 76 are connected so that the polarity of the net circuit gain switches when the polarity of the input signal reverses so that a precision absolute value circuit is provided which converts the AC or bi-directional signal developed across the resistors 24, 30 into a unipolar output signal. These operational amplifiers also provide equal gain magnitudes for input signals of either polarity so that an absolute-value conversion is provided by the amplifier 35.

The output of the amplifier is smoothed in the circuit comprising the series resistors 92, 94 and the shunt capacitor 96, the signal across the capacitor 96 having a value of approximately 4.5 volts DC for an input of 150 millivolts to the absolute-value amplifier 35. This signal is applied to the noninverting input of an operational amplifier 98 (preferably commercial type LM324) and a set point signal, which is derived from a regulated 5 volt supply, is connected from the arm of a voltage divider potentiometer 100 and through a resistor 102 to the inverting input of the operational amplifier 98. A feedback capacitor 104 is connected between the output of the operational amplifier 98 and its inverting input so that additional integration and filtering of the current and voltage summed waveform is provided at the output of the operational amplifier 98.

The output of the operational amplifier 98 is connected to the noninverting input of a comparator 106 (preferably commercial type LM339) to one input of which is supplied a ramp signal developed by the ramp generator 40. This ramp signal is developed by detecting the zero crossover points of the AC wave. Specifically, the AC voltage developed across the auto transformer 10 is supplied through a resistor 108 to a pair of oppositely polarized diodes 110 and 112 which are connected to the voltage divider network 113, 115 between plus 12 volts and ground. The diodes 110, 112 are connected across the inputs of a comparator 114 (preferably commercial type LM339) through the resistors 116 and 118 so that the square wave output signal 36a (FIG. 6a)

coincident with the crossover points of the AC wave is developed at the output of the comparator 114.

The output of the zero crossing detector 36 is supplied directly to the input of an edge triggered flip-flop 117 and through the inverter 119 to the input of a second edge triggered flip-flop 121. Preferably the flip-flop 117 and 121 are of the commercial type 4013. The flip-flops 117, 121 are triggered from either the positive edge or the negative edge of the square wave produced at the output of the cross over detector 36 and the latched outputs of these flip-flops are supplied to the two inputs of an OR gate 122. The output of the OR gate 122 is supplied to the noninverting input of an operational amplifier 124 (preferably commercial type LM 324) which is provided with the feedback capacitor 126 so that it operates as an integrating amplifier and develops the ramp signal 41 (FIG. 6c) at its output which commences at the zero crossover point of each half cycle of the AC power wave.

When the ramp signal applied to the inverting input of the comparator 106 reaches the level of the output of the error amplifier 34, the negative going signal 43 is developed at the output of the comparator 42 which is employed to control firing of the SCR's in the SCR bridge. The output of the amplifier 106 is supplied to a gate drive timer 44 (preferably commercial type 555). Specifically, the timer 44 is triggered by the negative going signal 43 from the output of the comparator 106 and provides a gating pulse on its output terminal 3 of a duration of approximately one millisecond, this gate pulse being shown in FIG. 6(e) as the pulse 127. The gate pulse 127 is supplied over the conductor 128 to the rest terminals of the flip-flops 117 and 121 so that these flip-flops are reset and may respond to the next zero cross over point of the AC wave. The gate pulse 127 is also supplied to an RC feedback oscillator 46 comprising the NAND gate 130, the resistors 132 and 134 and the shunt capacitor 136. The oscillator 46 operates at a frequency of 40 kHz for the duration of the gate pulse 127. The output of the NAND gate 130 is connected to one input of a negated input OR gate 138 so that a series of square wave pulses 140 (FIG. 6(f)) are developed at the output of the gate 138. This output is supplied to two NAND gates 140 and 142 which are alternately rendered conductive by the zero cross over wave form 36a which also triggers the latches 117 and 121. Accordingly, the drive pulses 140 are alternately supplied through the NAND gates 140, 142 to the respective driver transistors 150 and 152. The transistor 150 supplies the wave form 140 over the conductor 151 to the primary of a pulse transformer 153. The two secondary windings of the transformer 153 are connected between the gate electrodes and cathodes of the SCR's 31 and 34 through the diodes 155 and 157, respectively, so that these SCR's are turned on simultaneously. The transistor 152 supplies a similar gating wave form 140 over the conductor 159 to the primary of the pulse transformer 161 the two secondaries of which control the SCR's 32 and 33 so that these SCR's are turned on simultaneously during the opposite half cycle of the AC wave. The gating wave form 140 is of sufficient duration to insure that the controlled pair of SCR's in the SCR bridge are rendered conductive at the desired firing point on the AC wave after which these SCR's remain conductive until the current through the SCR's goes to zero.

In accordance with an important aspect of the present invention the light output of the lamp 12 may be varied by adjustment of the load line 70. Such variation becomes important in situations where very sensitive material is being processed which requires a very short exposure time. If a 4 kw lamp is being employed in such a situation it would be desired to reduce the light output of the lamp 12 by half so as to give the operator a longer exposure time to work with.

One way in which the light output of the lamp 12 may be reduced is by adjustment of the potentiometer 100 which changes the reference value against which the sum of the current and voltage components is held constant. Such adjustment has the effect of shifting the load line 70 to the left, as shown in 70a in FIG. 5, when the set point voltage at the arm of the potentiometer 100 is reduced. However, bodily shifting the load line to the position 70a has the disadvantage that the 300 V point for no-load conditions is reduced which means that the amplitude of the waveform 162 is also reduced and may not be satisfactory for starting the lamp.

Figure 10:
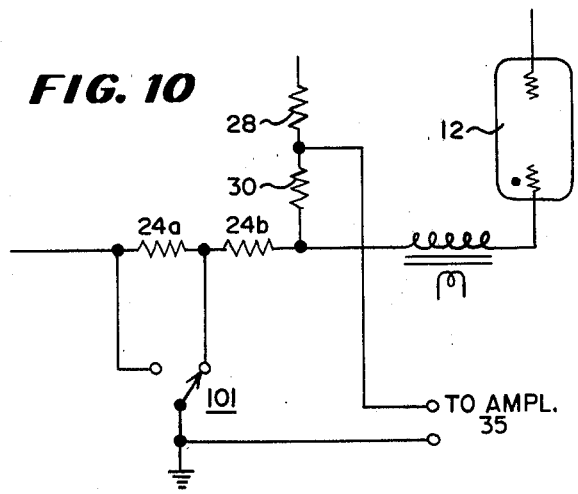
FIG. 10 is a schematic diagram of an alternative arrangement for reducing lamp output in the circuit of FIG. 1.
Figure 5:
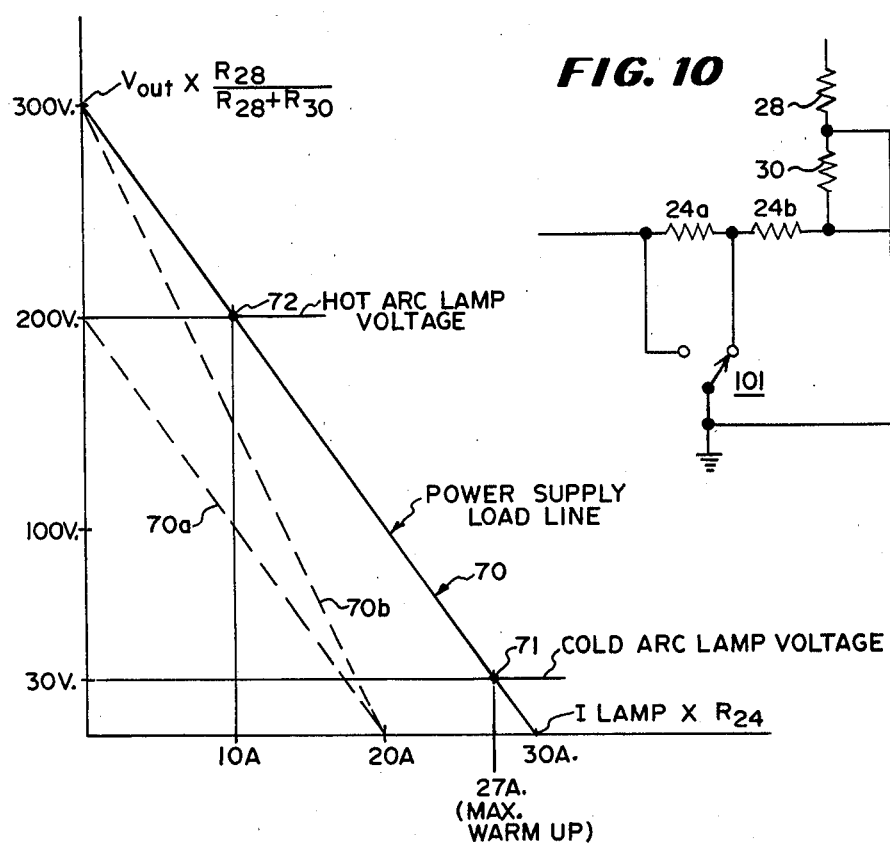
FIG. 5 is a diagrammatic illustration of the load line characteristic found in the power supply of FIG. 1.

A preferred way of reducing the light output of the lamp 12 is to adjust the x axis intercept of the load line while holding the y axis intercept constant so that a load line such as shown at 70b in FIG. 5 is provided. The load line 70b may be achieved by employing the circuit of FIG. 10 wherein two equal value current sensing resistors 24a and 24b are connected in series. In FIG. 10, the resistors 28 and 30 remain the same so that the maximum voltage point, i.e., 300 volts is held constant. However, depending upon the position of the selector switch 101 the input to the absolute value amplifier 35 includes either the voltage across one of the resistors 24a, 24b or the voltage across both of these resistors. When the voltage across both resistors is sensed a smaller current flowing through both resistors will give the short circuit intercept value of 150 millivolts described above so that the maximum value of current supplied to the lamp 12 is reduced as shown by the load line 70b. If the resistors 24a and 24b each have a value of 0.005 ohms, the maximum current will be reduced to half value, i.e., 15 amperes.

Other arrangements may obviously be employed to change the value of the current sensing element without changing the value of the voltage sensing element. However, it should be noted that since the resistor 24 has an extremely low value, i.e., 0.005 ohms it is difficult to switch a similar value of resistor in and out of the lamp current circuit. The circuit of FIG. 10 avoids this by leaving the two resistors in the circuit at all times and switching the sensing input to the amplifier 35. When the single resistor 24b is being sensed the voltage across the resistor 24a is only 150 millivolts at maximum current conditions and hence does not interfere with the operation of the amplifier 35. In the embodiment of FIG. 10 the common circuit ground is converted to the movable arm of the switch 101.

Figure 9:
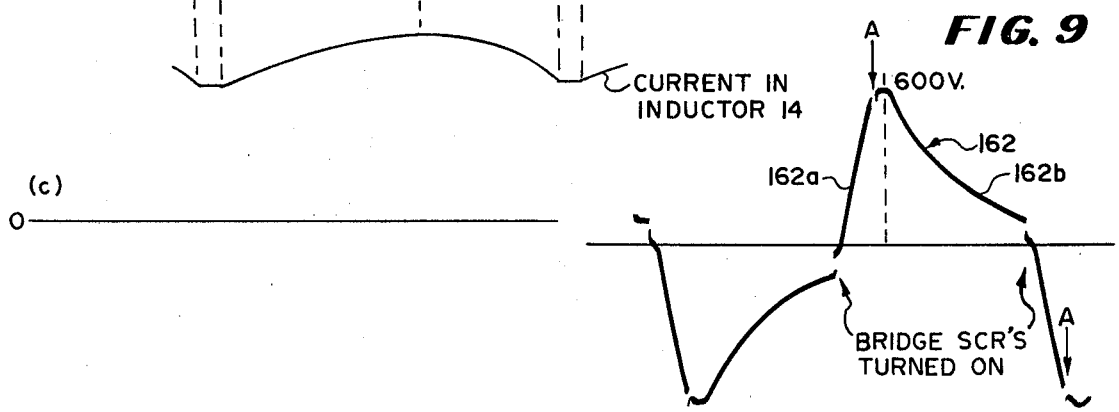
FIG. 9 is a waveform showing the relationship between the open circuit voltage impressed on the lamp and the lamp strike pulses.

Considering now, in more detail, the bypass network 27, this network includes a first bypass capacitor 160 which is connected across one end of the secondary windings 16, 20 of the lamp strike pulse transformer so as to complete the AC path for lamp strike pulses produced across these transformers while preventing these high voltage pulses from affecting the SCR bridge. However, before an arc discharge is started in the lamp 12, the SCR bridge is operating under an essentially no-load condition. Under these conditions, the wave form which is supplied to the lamp 12 is as shown at 162 in FIG. 9. Referring to this figure, since the SCR bridge circuit has only the bypass network as a small load prior to conduction of the lamp 12, the capacitor 160 is quickly charged by current from the bridge during the portion 162a of the wave form 162. As soon as the capacitor 160 is charged, the bridge SCR's turn off again. If the capacitor 160 were not discharged before the next conduction period of the SCR bridge, voltage would build up on the capacitor 160 during successive half cycles which would over stress the bridge SCR's. In order to discharge the capacitor 160 between conduction periods of the SCR bridge, a resistor 164 is connected across the capacitor 160 so that this capacitor is discharged each half cycle, as indicated by the portion 162b of the wave form 162 in FIG. 10.

In accordance with an important aspect of the present invention, the lamp strike pulses which appear across the secondaries 16, 20 are produced at a point on the wave form 162 where the voltage applied to the lamp is relatively high and the SCR bridge is still conducting so that it can provide the necessary follow through current to establish full conduction in the lamp 12. The high voltage lamp strike pulses cause a spark from one lamp electrode to the other. However, if this spark is created during a period when the SCR bridge is not conducting, there will be no source of current to establish a conductive path through the lamp of sufficient magnitude to provide a sustained arc discharge. Specifically, the lamp strike pulses are provided at the point A in FIG. 9, at which point the voltage across the lamp is relatively high and the capacitor 160 is still being charged so that the SCR's in the SCR bridge are still conducting. Accordingly, once a spark has been established from one lamp electrode to another, the SCR bridge can supply the necessary current to sustain an arc discharge.

While the SCR bridge is capable of supplying follow-through current to the lamp 12, a certain amount of time is required for current to flow out of the SCR bridge circuit and into the lamp 12. The capacitor 160 is preferably of a relatively small value in the order of 0.22 microfarads, to act as a high frequency by-pass for the secondaries 16, 20 while permitting this capacitor to be quickly discharged between conduction periods of the SCR bridge by the resistor 164. Also, the use of a small capacitor 160 is desirable to avoid relatively low frequency resonance effects with the large storage inductor 14. Therefore the capacitor 160 is too small to provide the necessary current to the lamp to sustain an arc discharge while current is being transferred out of the SCR bridge to the lamp. Accordingly, a second capacitor 166 is connected in series with a resistor 168 across the capacitor 160, the capacitor 166 having a value approximately ten times the value of the capacitor 160. The resistor 168 has a value of 250 ohms so that it lowers the Q of the resonant circuit which includes the energy storage inductor 14 and the circuit capacities. Due to the larger capacitance value of the capacitor 166, a larger amount of current can flow out of the capacitor 166 and into the lamp 12 once a spark has been established in the lamp to sustain an arc discharge until current of even greater magnitude is supplied from the AC supply through the SCR bridge. The capacitor 166 is also discharged by the resistors 164 and 168 each half cycle to prevent voltage build up on this capacitor.

A one second timer 172 (FIG. 3) is provided which is controlled by the on/off switch of the power supply so that the timer produces an output pulse for one second after AC is applied to the auto-transformer 10. This one second delay gives sufficient time for the appropriate supply voltages to be developed for the solid state circuitry of the power supply system.

The output of the timer 172 is supplied to a two second timer comprising a transistor 174 and operational amplifier 176 and associated circuitry so that a two second timing period is established for producing lamp strike pulses at the end of which timing period the production of lamp strike pulses will be terminated, it being assumed that the lamp 12 has been ignited during this two second interval. This two second interval is established by charging of the capacitor 178, the output of the operational amplifier 176 being employed to enable a delay timer 180 (preferably commercial type 555) to the input terminal 2 of which is supplied the output of the comparator 42 over the conductor 182.

In order to time the lamp strike pulses so that they are produced at the point A on the wave form 62 during each half cycle, the lamp strike circuit 170 is controlled from the output of the comparator 42 with a suitable delay inserted so that the lamp strike pulses are produced a predetermined period after the bridge SCR's are fired. More particularly, the timer 180 utilizes a time constant circuit comprising the capacitor 184, the resistor 186 and the potentiometer 188 to develop a delay interval pulse 189 (FIG. 7g) for one to two milliseconds after the firing of the bridge SCR's. By variation of the potentiometer 182, the position of the lamp strike pulses may be varied relative to the SCR firing point so as to position the lamp strike pulses at the point A in FIG. 9.

The output of the delay timer 180 is supplied to a differentiating circuit comprising the series capacitor 190, the series resistor 192 and the shunt resistor 194, to develop the differentiated pulses 195a and 195b (FIG. 6h). A diode 196 is employed to remove the positive pulses 195a produced at the leading edge of the output wave from the timer 180. The negative going pulses 195b are applied to the base of a transistor 198 coincident with the trailing edge of the delay interval pulse 189 from the timer 180 so that a lamp strike drive pulse 197 (FIG. 6i) is produced at the collector of the transistor 198 each half cycle of the AC wave during the operative period of the timer 180.

The collector of the transistor 198 is connected to the primary winding 200 of the input pulse transformer 202 in the lamp strike circuit 170. The circuit 170 provides two separate circuits for supplying lamp strike pulses to the transformers 18, 22, these independent circuits being controlled by the lamp strike drive pulses supplied to the primary winding 200 of the transformer 202. Considering first the circuit associated with the transformer 18, the AC voltage developed across the auto-transformer 10 is rectified in the rectifier 204 and filtered in the capacitor 206 and resistor 208 so that a DC voltage of approximately 400 volts is provided for charging a pulse transformer drive capacitor 210 through the resistors 212 and 214. The lamp strike drive pulses are supplied from the secondary winding 216 of the transformer 202 through a diode 218 to the gate electrode of an SCR 220, a resistor 222 being connected between the gate electrode and the cathode of the SCR 220. The SCR 220 is connected in a series circuit which includes the primary winding 224 of the pulse transformer 18, the capacitor 210 and a small saturating coil 226, the junction of the coil 224 and the cathode of the SCR 220 being connected to the ground terminal of the common DC supply which charges the capacitor 210 through the resistors 212, 214.

The other drive circuit for the transformer 22 comprises the capacitor 228 which is connected in series with the primary winding 230 of the pulse transformer 22, an SCR 232 and a saturating coil 234. The SCR 232 is fired by pulses developed across the secondary 236 of the transformer 202 which is connected to the gate electrode of the SCR 232 through the diode 238. The capacitor 228 is separately charged from the DC supply developed across the capacitor 206 through the resistors 240 and 242.

Considering now the operation of the lamp strike drive pulse circuit associated with the pulse transformer 18, the primary winding 224 of the transformer 18 preferably has an inductance of 4 microhenrys and consists of four turns of wire whereas the secondary winding 16 thereof has 230 turns so that an extremely large step up in voltage is produced by the pulse transformer 18. In order to get a lamp strike drive pulse of approximately 15,000 volts amplitude across the secondary winding 16 it is necessary to have a peak current of approximately 300 amperes flowing in the primary winding 224. When the lamp strike drive pulse is developed across the secondary winding 216 of the transformer 202 the SCR 220 is triggered on. However, the SCR 220 does not immediately become fully conductive but requires a certain brief time interval to turn on completely and become fully conductive. When the SCR is initially triggered on a small junction area is first rendered conductive and this small conductive area cannot support the extremely high dissipation which would result if full current were passed through the SCR 220. However, the saturating reactor 226 has a value of approximately 200 microhenrys, approximately fifty times the inductance of the primary 224, and hence functions to limit the current flow through the primary winding 224 while the conductive junction area of the SCR 220 is spreading to include the full junction. When the full junction area of the SCR 220 is conducting the reactor may then saturate without damage to the SCR 220.

In accordance with an important aspect of the present invention, the saturating reactor 226 is provided with an extremely square hysteresis loop characteristic so that it in effect controls connection of the charged capacitor 210 to the primary winding 224 when its core saturates. Preferably, the saturating reactor 226 comprises an ungapped toroidal core which is tape wound with a material having an extremely square hysteresis loop. Preferably, this material is grain oriented steel tape sold under the tradename Deltamax by Allegheny Ludlum Industries. By employing such a saturating reactor, the SCR 220 may be of the commercial type 2N3899, which is relatively inexpensive, and which if employed by itself would be incapable of providing a fast enough current turn on time as well as being incapable of initially dissipating a peak current of 300 amperes. However, the saturating reactor 226 delays the current buildup in the primary winding 224 until the SCR 220 has become fully conductive over the entire junction area thereof and then switches the current on extremely rapidly under the control of its own square cornered hysteresis loop. By employing a saturating reactor of the above described construction it has been found that the primary voltage may be switched from a value of zero to 280 volts across the primary 224 in one microsecond. This extremely fast rise time for the pulse applied to the primary 224 has been found satisfactory for coupling to the secondary 16 so that a lamp strike pulse of approximately 15,000 volts amplitude is developed across the secondary 16.

The lamp strike drive circuit for the primary winding 230 of the transformer 22 functions in a similar manner and the saturating reactor 234 in this circuit is of the same construction described above. Since the lamp strike pulses are simultaneously produced across the secondaries 16, 20 a total voltage pulse of approximately 30,000 volts is supplied to the electrodes of the lamp 12 at point A (FIG. 9) on the waveform 162 once each half cycle of the input AC wave. With this arrangement it has been found that a hot lamp which has been turned off may be restarted within a fraction of a second after lamp strike drive pulses are supplied to the transformer 202. As stated heretofore, these drive pulses are terminated after approximately two seconds by disabling the delay timer 180.

The auto transformer 10 is customarily provided with a series of taps 10a, 10b and 10c through which the AC supply may be connected, these taps corresponding to input line voltages of 240 volts, 220 volts and 200 volts respectively. In accordance with a further aspect of the present invention an arrangement is provided for visually informing the operator when the correct tap has been selected for a particular AC supply. More particularly, the voltage across the auto transformer 10 is supplied to a voltage divider network comprising the resistors 250 and 252, these resistors being chosen so that the voltage developed across the resistor 252 will be 4.6–5.6 peak volts AC when the voltage developed by the auto transformer 10 is of the correct amplitude. The voltage across the resistor 252 is rectified in the rectifier 254 and supplied to the condenser 256 so that a DC voltage of 4.0–5.0 volts DC is developed across this capacitor. The voltage across the capacitor is compared separately with a 5 volt reference signal and a 4 volt reference signal, derived from a well regulated supply, by means of the comparators 258 and 260. More particularly, the voltage across the capacitor 256 is supplied to one input of the comparator 258 through the resistor 252 and to the other input of the comparator 260 through a resistor 264. A 5 volt reference signal is supplied to the other input of the comparator 258 through a resistor 266 and is also supplied to a voltage divider comprising the resistors 268 and 269 which are of appropriate values so that 4 volts is developed across the resistor 269. This 4 volt reference signal is then supplied through the resistor 270 to the other input of the comparator 260.

The comparators 258 and 260 control a pair of LED's 272 and 274. If the voltage across the capacitor 256 has a value which is more than 4 volts but less than 5 volts, both of the LED's 272 and 274 will be rendered conductive by the outputs of the comparators 258 and 260, thereby informing the operator that the AC supply is correctly connected to one of the taps 10a–10c on the auto transformer 10. However, if the voltage on the capacitor 256 is above 5 volts the LED 272 is rendered nonconductive due to the change in output state of the comparator 258. The operator is thereby informed that the AC supply is connected to a lower one of the tape 10b or 10c so that excessive voltage is being produced by the auto transformer 10. On the other hand, if the voltage developed across the capacitor 256 is below 4 volts then the LED 272 remains conductive but the LED 274 is rendered nonconductive by the change in output state of the comparator 260. This informs the operator that the AC line voltage is connected to too high a tap so that too low a voltage is supplied to the SCR bridge and lamp 12.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a lamp strike circuit for initiating an arc in a high intensity discharge lamp, the combination of, a source of alternating current, means including at least a pair of controlled rectifiers for supplying power to the lamp from said AC source, a pair of pulse transformers each having a secondary winding one each of which is connected to one electrode of the lamp, a capacitor connected across the other end of said secondary windings, means for supplying lamp strike pulses to the primary windings, means for supplying lamp strike pulses to the primary windings of the said pulse transformers so that high voltage pulses are developed across said secondary windings which cause the formation of an arc within the lamp, said capacitor shunting the ends of said secondary windings to prevent said high voltage pulses from reaching said controlled rectifiers, and said capacitor also being charged from said source when said controlled rectifiers are conducting and an arc has not been initiated in said lamp, and resistive means for discharging said capacitor between conduction periods of said controlled rectifiers to prevent voltage build-up on said capacitor during successive half cycles of said alternating current source.

2. The combination of claim 1, wherein said capacitor has an impedance in the order of 15 ohms at the frequency of said high voltage pulses.

3. The combination of claim 1, wherein said capacitor has a capacitance value in the order of 0.22 microfarads.

4. The combination of claim 1, which includes a resistor and second capacitor connected in series across said first named capacitor, said second capacitor having a substantially larger capacitance value than said first named capacitor to recharge said first named capacitor and maintain a conductive path through the lamp after an initial spark discharge within the lamp.

5. The combination of claim 4, wherein said resistive means comprises a second resistor connected in parallel with the parallel combination of said first named capacitor and said series connected resistor and second capacitor.

6. The combination of claim 4, wherein said second capacitor has a capacitance value in the order of 2.0 microfarads.

7. The combination of claim 4, wherein said resistor has a resistance value in the order of 250 ohms.

8. In a control system for a high intensity discharge lamp, the combination of, a source of alternating current, means including at least a pair of silicon controlled rectifiers for supplying power to the lamp from said AC source, means for controlling the firing point of said controlled rectifiers, and means controlled by said firing point control means for applying lamp strike pulses to the lamp a predetermined time interval after said controlled rectifier firing point and when the voltage across the lamp has reached a substantial value, thereby to cause the formation of an arc within the lamp.

9. The combination of claim 8, which includes a pair of pulse transformers each having a secondary winding connected to one electrode of the lamp, and means for supplying said lamp strike pulses to the primary windings of said pair of pulse transformers.

10. The combination of claim 9, which includes a capacitor connected in series with each of said primary windings, means for developed a d.c. voltage from said AC source, means for charging both of said capacitors from said d.c. voltage, and means connected across each capacitor and primary winding series combination for discharging the capacitor through the associated primary winding, thereby simultaneously to produce high amplitude lamp strike pulses across said secondary windings.

11. The combination of claim 10, wherein said discharging means comprises a semiconductor switching means connected across each capacitor and primary winding series combination and each having a gate electrode, and means for simultaneously applying lamp strike pulses to the gate electrode of each of said semiconductor switching means.

12. The combination of claim 11, which includes a saturable reactor connected in series with each of said capacitor and primary winding series combinations, said saturable reactor initially limiting current flow through said semiconductor switching means when said lamp strike pulses are applied to the gate electrodes thereof and becoming saturated a predetermined short interval after the voltage across each semiconductor switching means is reduced.

13. The combination of claim 12, wherein each of said saturable reactors has a saturation characteristic with a sharp knee so that when said reactor becomes saturated the current flow thorugh the associated primary winding increases very rapidly, thereby to provide a lamp strike pulse of large amplitude across each of said secondary windings.

14. In a lamp strike circuit for initiating an arc in a high intensity discharge lamp, the combination of, a pulse transformer having a primary winding and a secondary winding, means connecting said secondary winding in circuit with the lamp, a series circuit comprising said primary winding, a capacitor, a saturable reactor and a silicon controlled rectifier, means for charging said capacitor to a predetermined voltage level, and means for applying a gate pulse to the gate electrode of said silicon controlled rectifier, said saturable reactor having an inductance many times larger than the inductance of said primary, thereby to limit current flow in said series circuit for a predetermined time interval which is sufficient to permit said silicon controlled rectifier to become fully conductive.

15. The lamp strike circuit of claim 14, wherein said reactor saturates very quickly after said silicon controlled rectifier is fully conductive, thereby to produce a very abrupt application of voltage to said primary winding.

16. The lamp strike circuit of claim 14, wherein the time interval required for said reactor to become saturated is in the order of one microsecond.

17. The lamp strike circuit of claim 14, wherein said saturable reactor has an inductance in the order of fifty times as great as said primary winding.

18. The lamp strike circuit of claim 17, wherein said saturable reactor has a tape wound toroidal core made of a material having a very square hysteresis loop so that saturation of said reactor takes place very quickly.

19. A control circuit for a high intensity discharge lamp which reduces warm-up time of the lamp, comprising a source of alternating current, control means connected in series with said lamp, the series combination of said lamp and said control means being connected across said source of alternating current, a first resistor for developing a voltage proportional to the current flow through the lamp, a second resistor for developing a voltage proportional to the voltage across the lamp, the values of said first and second resistors being chosen so that a predetermined voltage is developed across said first resistor when the lamp is short circuited which predetermined voltage is equal to the voltage developed across said second resistor when the lamp is open circuited, means for developing a reference signal, and means jointly controlled by said reference signal and the voltages developed across said first and second resistors for controlling said control means to maintain the sum of the voltages developed across said first and second resistors equal to said predetermined voltage as the lamp warms up from an initially cold condition.

20. The combination of claim 19, which includes means for selectively varying the value of said first resistor to thereby vary the light output of said lamp.

21. The combination of claim 19, which includes means for comparing the sum of the voltages developed across said first and second resistors with said reference signal to develop an error signal equal to the difference between said voltage sum and said reference, and means controlled by said error signal for controlling said control means in the direction to reduce said error signal.

22. The combination of claim 21, which includes means for selectively varying the value of said reference signal to thereby vary the light output of said lamp.

23. A control circuit for a high intensity discharge lamp which reduces warm-up time of the lamp, comprising a source of alternating current, control means connected in series with said lamp, the series combination of said lamp and said control means being connected across said source of alternating current, means for sensing the current flowing through the lamp and the voltage developed across the lamp, and means responsive to said current and voltage sensing means for controlling said control means so that the lamp is operated along a linear current-voltage load line as the lamp warms up from a cold condition, said current-voltage load line extending from a first point on the current axis corresponding to a short circuit current through the lamp to a second point on the voltage axis corresponding to the open circuit voltage across the lamp when no current is flowing therethrough.

24. The combination of claim 23, wherein said current and voltage sensing means comprise first and second resistive means for producing control voltages proportional respectively to the current flow through and voltage across the lamp, the values of said first and second resistive means being chosen so that the voltage developed across said first resistive means under a short circuit condition of the lamp is equal to the voltage developed across said second resistive means under an open circuit condition of the lamp.

25. A control circuit for a high intensity discharge lamp which reduces warm-up time for the lamp, comprising a source of alternating current, energy storage inductance means, first and second pairs of controlled rectifiers, each of said pairs being connected in series with said energy storage inductance means so that current flows through said inductance means in the same direction upon conduction of either of said pairs of rectifiers, means for connecting said energy storage inductance means in series with the lamp across said AC source, means for developing AC control signals proportional to the flow of AC current through the lamp and the AC voltage across the lamp, and means controlled by said control signals for varying the firing point of each of said pairs of controlled rectifiers so that the current flow through the lamp is initially limited to maximum predetermined value when the lamp is cold and said current flow is proportionately decreased in response to an increase in the voltage developed across the lamp as the lamp warms up.

* * * * *